United States Patent
Mitsuhashi et al.

(10) Patent No.: US 7,068,908 B2
(45) Date of Patent: Jun. 27, 2006

(54) RESIN LIQUID FOR OPTICAL FIBER COATING LAYER

(75) Inventors: Keiko Mitsuhashi, Sakura (JP); Tsuyoshi Shimomichi, Sakura (JP); Keiji Ohashi, Sakura (JP)

(73) Assignee: Fujikura, Ltd., Tokyo (JP)

( * ) Notice: Subject to any disclaimer, the term of this patent is extended or adjusted under 35 U.S.C. 154(b) by 128 days.

(21) Appl. No.: 10/315,882

(22) Filed: Dec. 10, 2002

(65) Prior Publication Data

US 2003/0152351 A1    Aug. 14, 2003

(30) Foreign Application Priority Data

Feb. 8, 2002   (JP) .................... P 2002-033057

(51) Int. Cl.
*G02B 6/00* (2006.01)
*G02B 6/02* (2006.01)
*G02B 6/16* (2006.01)
*G02B 6/22* (2006.01)

(52) U.S. Cl. ............... 385/144; 385/123; 385/126; 385/127; 385/128; 385/141; 385/145

(58) Field of Classification Search ............. 385/144, 385/128, 141
See application file for complete search history.

(56) References Cited

U.S. PATENT DOCUMENTS

| | | | | |
|---|---|---|---|---|
| 4,381,269 A | * | 4/1983 | Kaino et al. | 264/1.24 |
| 5,136,679 A | * | 8/1992 | Broer et al. | 385/128 |
| 5,190,364 A | * | 3/1993 | Imoto et al. | 385/24 |
| 6,777,083 B1 | * | 8/2004 | Mizota et al. | 428/373 |

FOREIGN PATENT DOCUMENTS

| | | | |
|---|---|---|---|
| JP | 05-203847 | * | 8/1993 |
| JP | 2585373 | | 2/1995 |
| JP | 09-156966 | | 6/1997 |

* cited by examiner

*Primary Examiner*—Frank G. Font
*Assistant Examiner*—Ryan Lepisto
(74) *Attorney, Agent, or Firm*—Hoffmann & Baron, LLP

(57) ABSTRACT

A resin liquid is provided which is used to produce an optical fiber coating layer which does not degrade over time in long-period transmission characteristics of the optical fiber. An optical fiber in which long-period transmission characteristics do not degrade is also provided. In order to achieve these objects, the present invention provides a resin liquid for an optical fiber coating layer containing at least one resin, wherein the resin liquid contains fewer than 500 pieces of extraneous material per 1 ml of the resin liquid, which have a minimum length of 0.5 µm or more and a hardness greater than a hardness of the resin liquid after curing.

12 Claims, No Drawings

RESIN LIQUID FOR OPTICAL FIBER COATING LAYER

BACKGROUND OF THE INVENTION

1. Field of the Invention

This application relates to a resin liquid for an optical fiber coating layer, and an optical fiber comprising a coating layer made of the resin liquid.

2. Description of the Related Art

An optical fiber comprises a naked optical fiber made by forming a strand, a first coating layer formed on the naked optical fiber, and a second coating layer formed on the first coating layer. As resins for the first and second coating layers, in view of productivity, such as cure rate, ultraviolet curable resins, such as urethane acrylates, and epoxy acrylates, are mainly used. In addition, silicone resins, denatured silicone resins and the like are also used.

An optical fiber comprising a coating layer made of ultraviolet curable resins is manufactured by coating an ultraviolet curable resin liquid before curing onto a naked optical fiber; irradiating ultraviolet light and curing the ultraviolet curable resin liquid on the naked optical fiber, thereby preparing a first coating layer which is relatively soft; coating an ultraviolet curable resin liquid before curing onto the first coating layer; and irradiating ultraviolet light and curing the ultraviolet curable resin liquid on the first coating layer, and thereby a second coating layer which is relatively hard is prepared.

There is a possibility that many kinds of extraneous materials will contaminate the ultraviolet curable resin liquid from manufacturing devices, a container thereof, and the like, during manufacturing and transferring. Among extraneous materials, the relatively large extraneous materials having a size more than 1 mm or greater can be removed from the ultraviolet curable resin liquid by filtration during manufacturing. However, it is difficult for the relative small extraneous materials having a size 100 μm or smaller, for example, to be detected visually. Therefore, there is a possibility that small extraneous pieces of material will remain in the resin liquid and be coated onto the naked optical fiber or the coating layer, and thereby the small extraneous materials contaminate in the coating layer.

Long-period transmission characteristics of the optical fiber contaminated with the small extraneous materials in the coating layer sometimes degrade, due to the extraneous materials. Specifically, when heat-cycle tests are carried out repeatedly to test long-period transmission characteristics, optical fibers, in which long-period transmission characteristics decrease whenever heat-cycle tests are carried out, are sometimes found. It was confirmed by observation of the coating layer of the optical fiber in which long-period transmission characteristics degrade that fine air gaps are generated in the coating layer, and that the air gaps are generated from the extraneous materials as starting points. When the extraneous material is harder than the ultraviolet cured resin around the extraneous material, the interface between the ultraviolet cured resin and the extraneous material is peeled due to compressive stress generated by repeated heat-cycle tests, and the peeled portion causes brittle fracture in the ultraviolet cured resin.

Due to this brittle fracture, the size of the air gap increases, and compressive stress due to the air gap causes nonuniform microbends. It is believed that as a result, transmission characteristics of the optical fiber degrades by the nonuniform microbends.

Moreover, the peeling between the ultraviolet cured resin and the extraneous material is generated depending on the number of the extraneous materials in the coating layer. Therefore, it is thought that when the number of the extraneous materials is small, degradation of transmission characteristics hardly occurs.

SUMMARY OF THE INVENTION

In consideration of the above described problems in conventional technology, objects of the present invention are to provide a resin liquid for an optical fiber coating layer which does not cause degradation of long-period transmission characteristics of the optical fiber, and an optical fiber and an optical fiber cable in which degradation of long-period transmission characteristics does not occur.

In order to achieve the objects, the present invention provides a resin liquid for an optical fiber coating layer containing at least one resin, wherein the resin liquid contains less than 500 pieces of extraneous material per 1 ml of the resin liquid, which have a minimum length of 0.5 μm or more and a hardness greater than the hardness of the resin liquid after curing.

In the resin liquid for an optical fiber coating layer, it is preferable for the resin to be ultraviolet curable resin.

According to the resin liquid for an optical fiber coating layer, since the content of the extraneous materials in the resin liquid is small, the degradation of long-period transmission characteristics of the optical fiber is prevented. In addition, since the mechanical strength of the coating layer is improved, the mechanical strength of the optical fiber is also improved.

In addition, in order to achieve the object, the present invention provides an optical fiber comprising a coating layer which is obtainable by coating and curing the resin liquid for an optical fiber coating layer.

According to the optical fiber, since the content of the extraneous materials in the coating layer is small, the degradation of long-period transmission characteristics of the optical fiber is prevented. In addition, since the mechanical strength of the coating layer is improved, the mechanical strength of the optical fiber is also improved.

In addition, in order to achieve the object, the present invention provides an optical fiber cable comprising the optical fiber.

DETAILED DESCRIPTION OF THE PREFERRED EMBODIMENTS

Below, the resin liquid for an optical fiber coating layer and the optical fiber of the present invention will be explained in detail.

The resin liquid for an optical fiber coating layer is a curable liquid (cross-linking) resin, for example, ultraviolet curable resins, such as urethane acrylates, epoxy acrylates, and the like, silicone resins, denatured silicone resins, and contains less than 500 pieces of extraneous material, and preferable less than 100 pieces of extraneous material per 1 ml. If the number of the pieces of extraneous material is 500 or more, long-period transmission characteristics are degraded, which is clear from the Examples below.

The extraneous materials are of fine grain, the minimum length thereof is 0.5 μm or more, and the hardness thereof is greater than that of the resin liquid after curing. Moreover, the shape of the extraneous materials is not restricted, and is variable. The minimum length means the shortest length in all directions of the extraneous material. The reason for setting the minimum length of the extraneous material to 0.5 μm or more is because if the minimum length of the extraneous material is less than 0.5 μm, the extraneous material can hardly cause an air gap affecting transmission characteristics.

Therefore, the extraneous materials are not restricted by materials, that is, they are not restricted to organic grains, inorganic grains, and metallic grains. If the extraneous materials are softer than the resin liquid after curing, the extraneous materials do not cause air gaps in the coating layer. Therefore, in the present invention, the extraneous materials which are softer than the resin are not contained in the extraneous materials. The extraneous material in the present invention are mainly metallic fine grains which are contaminated from a manufacturing device including a coating device, and pipes between the manufacturing device and the optical fiber, a container of the resin liquid, and the like.

The counting of the pieces of extraneous material in the resin liquid is carried out by using a counter for fine grains in liquids marketed by RION, HIAC, and ROYCO, and the like. The hardness of the extraneous materials can be measured by filtering out the extraneous materials from the resin liquid and using a microhardness tester marketed by SHIMADZU SEISAKUSHO, AKASHI, and the like. In addition, it is possible to filter out the extraneous materials, chemical analyze and characterize the material comprising the extraneous materials, and estimate the hardness thereof.

It is possible to adjust the number pieces of the extraneous materials in the resin liquid to be fewer than 500 per 1 ml, and preferably less than 100 per 1 ml, for example, by filtering out the extraneous materials in the resin liquid just before use, and preferably by filtering using a plurality of filters having different meshes, and cleaning the inside of the container of the resin liquid and the pipes of the manufacturing device at high level. In addition, when the resin liquid is coated on the naked optical fiber and the first coated layer, it is preferable to use a coating die made of a material which does not generate extraneous material such as rust. Furthermore, it is effective for decrease the number of pieces of extraneous material in the resin liquid to use raw materials of the resin liquid for an optical fiber coating layer which do not contain extraneous materials, and to control the manufacturing environment so as not to contaminate the extraneous material into the resin liquid.

In practice, since every resin liquid generally contains extraneous materials at a fixed amount and the fixed ratio is hardly varied, if the ratio of the extraneous materials with respect to the each resin liquid is measured one time in advance, the number of pieces of the extraneous materials can be adjusted merely by filtering just before use without checking the number of pieces of the extraneous materials in the each resin liquid.

Moreover, the number of pieces of the extraneous materials in the resin liquid means the number of pieces of the extraneous materials in the resin liquid just before coating in the specification.

The optical fiber of the present invention is obtained by coating and curing the resin liquid containing less than 500 pieces of the extraneous materials per 1 ml on the naked optical fiber, and thereby the coating layer is obtained. The coating layer is the first coating layer which is directly coated onto the naked optical fiber and the second coating layer which is coated onto the first coating layer. In particular, the first coating layer is preferably made of the resin liquid which contains small amount of the extraneous materials. Of course, it is possible for the second coating layer to be made of the resin liquid which contains small amounts of the extraneous materials.

The first coating layer is relatively soft, which has Young's modulus in a range from 0.3 to 10 MPa, and the second coating layer is relatively hard, which has Young's modulus in a range from 100 to 2,000 MPa. Therefore, the hardness in terms of Young's modulus of the extraneous materials contaminating the first coating layer is more than the range from 0.3 to 10 MPa, and the hardness of the extraneous materials contaminated in the second coating layer is more than the range from 100 to 2,000 MPa.

In the optical fiber, since the small number of pieces of the extraneous materials, of which the minimum length is 0.5 µm or greater and which are harder than the resin liquid after curing, are contaminated in the coating layer, there is no possibility in that the long-period transmission characteristics will degrade due to the extraneous materials. In addition, in the optical fiber, the degradation of the mechanical strength of the coating layer is prevented.

Below, the resin liquid for an optical fiber coating layer and the optical fiber of the present invention will be explained in detail.

EXAMPLES AND COMPARATIVE EXAMPLES 5 ultraviolet curable resin liquids containing the extraneous materials having a minimum length of 0.5 µm or greater and being harder than the ultraviolet cured resin at different contents were prepared. Then 5 optical fibers were prepared by coating the ultraviolet curable resin liquids on the naked optical fibers as a first coating layer.

After that, the temperature of the optical fibers was changed from −40° C. to +70° C. per one heat cycle. The increase of transmission loss (dB/km) at −40° C. of the optical fibers after 1, 10, 100, and 1,000 cycles of the heat cycle was measured at wavelength of 1.55 µm. The results are shown in the following Table 1.

TABLE 1

| | Number of pieces of extraneous materials | Increase of transmission loss (dB/km) Number of heat cycles (times) | | | |
|---|---|---|---|---|---|
| | (/1 ml) | 1 | 10 | 100 | 1,000 |
| 1 | 100 | 0 | 0 | 0 | 0 |
| 2 | 400 | 0 | 0 | 0 | 0.001 |
| 3 | 600 | 0 | 0 | 0.001 | 0.01 |
| 4 | 1,500 | 0 | 0 | 0.02 | 0.1 |
| 5 | 5,000 | 0 | 0.001 | 0.048 | 0.3 |

It is clear from Table 1 that the increase of transmission loss of the optical fibers comprising the coating layer made by the ultraviolet curable resin in which the content of the extraneous materials is fewer than 500 per 1 ml is 0.001 dB/km or less after 1,000 times of the heat cycle. Therefore, it was confirmed that the optical fibers made by the ultraviolet curable resins in which the content of the extraneous materials is less than 500 per 1 ml improved long-period transmission characteristics.

What is claimed is:

1. A resin liquid for an optical fiber coating layer for improving long-period transmission properties of an optical fiber which comprises a naked optical fiber and a coating layer, wherein the coating layer comprises a first coating layer which is directly coated onto the naked optical fiber and a second coating layer which is coated onto the first coating layer, the resin liquid containing at least one resin, wherein the resin liquid contains less than 500 pieces of extraneous material per 1 ml of the resin liquid, the extraneous material has a minimum length of 0.5 µm or more and a hardness greater than a hardness of the resin liquid after curing, and the resin liquid is used for forming at least the first coating layer, and wherein the first coating layer has a Young's modulus in a range from 0.3 to 10 MPa and contains less than 500 pieces of extraneous material per 1 ml of the resin liquid, and the extraneous material has a minimum length of 0.5 µm or more and a hardness greater than a hardness of the first coating layer.

2. A resin liquid for an optical fiber coating layer according to claim 1, wherein said resin is an ultraviolet curable resin.

3. A resin liquid for an optical fiber coating layer, for improving long-period transmission properties of an optical fiber which comprises a naked optical fiber and a coating layer, wherein the coating layer comprises a first coating layer which is directly coated onto the naked optical fiber and a second coating layer which is coated onto the first coating layer, the resin liquid containing at least one resin, wherein the resin liquid contains less than 500 pieces of extraneous material per 1 ml of the resin liquid, the extraneous material has a minimum length of 0.5 µm or more and a hardness greater than a hardness of the resin liquid after curing, and the resin liquid is used for forming at least the first coating layer, and wherein the second coating layer has a Young's modulus in a range from 100 to 2,000 MPa and contains less than 500 pieces of extraneous material per 1 ml of the resin liquid, the extraneous material having a minimum length of 0.5 µm or more and a hardness greater than a hardness of the second coating layer.

4. A resin liquid for an optical fiber coating layer according to claim 3, wherein said resin is an ultraviolet curable resin.

5. An optical fiber, comprising a naked optical fiber and a coating layer on the naked optical fiber, wherein the coating layer comprises a first coating layer which is directly coated onto the naked optical fiber and a second coating layer which is coated onto the first coating layer, wherein the first coating layer is obtainable by coating a resin liquid for an optical fiber coating layer for improving long-period transmission properties of an optical fiber onto the naked optical fiber and curing the resin liquid and has a Young's modulus in a range from 0.3 to 10 MPa, and wherein the resin liquid contains at least one resin and less than 500 pieces of extraneous material per 1 ml of the resin liquid, and the extraneous material has a minimum length of 0.5 µm or more and a hardness greater than a hardness of the first coating layer.

6. An optical fiber cable comprising an optical fiber according to claim 5.

7. An optical fiber comprising a naked optical fiber and a coating layer on the naked optical fiber, wherein the coating layer comprises a first coating layer which is directly coated onto the naked optical fiber and a second coating layer which is coated onto the first coating layer, wherein the second coating layer is obtainable by coating a resin liquid for an optical fiber coating layer for improving long-period transmission properties of an optical fiber onto the first coating layer and curing the resin liquid and has a Young's modulus in a range from 100 to 2,000 MPa, and wherein the resin liquid contains at least one resin and less than 500 pieces of extraneous material per 1 ml of the resin liquid, and the extraneous material has a minimum length of 0.5 µm or more and a hardness greater than a hardness of the second coating layer.

8. An optical fiber cable comprising an optical fiber according to claim 7.

9. A resin liquid for an optical fiber coating layer for improving long-period transmission properties of an optical fiber which comprises a naked optical fiber and a coating layer which comprises a first coating layer which is directly coated onto the naked optical fiber and a second coating layer which is coated onto the first coating layer, the resin liquid containing at least one resin, wherein the resin liquid contains less than 500 pieces of extraneous material per 1 ml of the resin liquid, the extraneous material having a minimum length of 0.5 µm or more and a hardness greater than a hardness of the resin liquid after curing, the resin liquid is used for forming both the first coating layer and the second coating layer, the first coating layer has a Young's modulus in a range from 0.3 to 10 MPa and contains less than 500 pieces of extraneous material per 1 ml of the resin liquid, the extraneous material in the first coating layer has a minimum length of 0.5 µm or more and a hardness greater than a hardness of the first coating layer, the second coating layer has a Young's modulus in a range from 100 to 2,000 MPa and contains less than 500 pieces of extraneous material per 1 ml of the resin liquid, and the extraneous material in the second coating layer has a minimum length of 0.5 µm or more and a hardness greater than a hardness of the second coating layer.

10. A resin liquid for an optical fiber coating layer according to claim 9, wherein said resin is an ultraviolet curable resin.

11. An optical fiber comprising a naked optical fiber and a coating layer on the naked optical fiber, wherein the coating layer comprises a first coating layer which is directly coated onto the naked optical fiber and a second coating layer which is coated onto the first coating layer, the first coating layer is obtainable by coating a resin liquid for an optical fiber coating layer for improving long-period transmission properties of an optical fiber onto the naked optical fiber and curing the resin liquid and has a Young's modulus in a range from 0.3 to 10 MPa, the resin liquid for the first coating layer contains at least one resin and contains less than 500 pieces of extraneous material per 1 ml of the resin liquid, the extraneous material in the resin liquid for the first coating layer has a minimum length of 0.5 µm or more and a hardness greater than a hardness of the first coating layer, the second coating layer is obtainable by coating a resin liquid for an optical fiber coating layer for improving long-period transmission properties of an optical fiber onto the first coating layer and curing the resin liquid and has a Young's modulus in a range from 100 to 2,000 MPa, the resin liquid for the second coating layer contains at least one resin and contains less than 500 pieces of extraneous material per 1 ml of the resin liquid, and the extraneous material in the resin liquid for the second coating layer has a minimum length of 0.5 µm or more and a hardness greater than a hardness of the second coating layer.

12. An optical fiber cable comprising an optical fiber according to claim 11.

* * * * *